Dec. 1, 1959 L. W. MONTGOMERY 2,915,001
COOKING UTENSIL
Filed Nov. 25, 1957

INVENTOR.
Leonard W. Montgomery
BY
ATTORNEY.

United States Patent Office 2,915,001
Patented Dec. 1, 1959

2,915,001

COOKING UTENSIL

Leonard W. Montgomery, Los Angeles, Calif.

Application November 25, 1957, Serial No. 698,422

3 Claims. (Cl. 99—339)

This invention relates to cooking structure and more particularly, to a combination utensil constructed in a manner so that various foods may be heated or cooked substantially at the same time from a single source of heat.

The primary object of this invention is to provide a cooking utensil having a plurality of containers disposed in vertically stacked relationship so that a plurality of different foods or the like may be cooked or heated from a single source of heat disposed beneath the lowermost of the containers.

Another object of this invention is to provide a cooking utensil as described which includes a plurality of vertically stacked containers which interlock so that the utensil presents a unitary structure, and which is adapted to cook or heat not only wet but also dry foods substantially simultaneously.

Other important objects of the invention include the provision of a cooking utensil having a plurality of interlocked, vertically stacked containers adapted to receive various kinds of foods, which is portable and may be used by the outdoorsman in a manner to simultaneously cook several types of food utilizing a single source of heat, such as commercially available canned heat; the provision of a utensil wherein the various containers thereof may each be utilized individually if desired to heat or cook various foods; the provision of novel handle structure on each of the vertically stacked containers constructed in a manner so that the elongated handles are normally disposed in proximal abutting relationship to the side wall of corresponding containers, but which may be swung outwardly and locked in a laterally extending position where the same may be utilized to facilitate handling of each of the containers; the provision of a sectional cooking utensil especially adapted for cooking or heating weiners, chili and hot dogs substantially simultaneously; and other important objects and details of construction which will become obvious as the following specification progresses.

Figures 1, 2, 3:
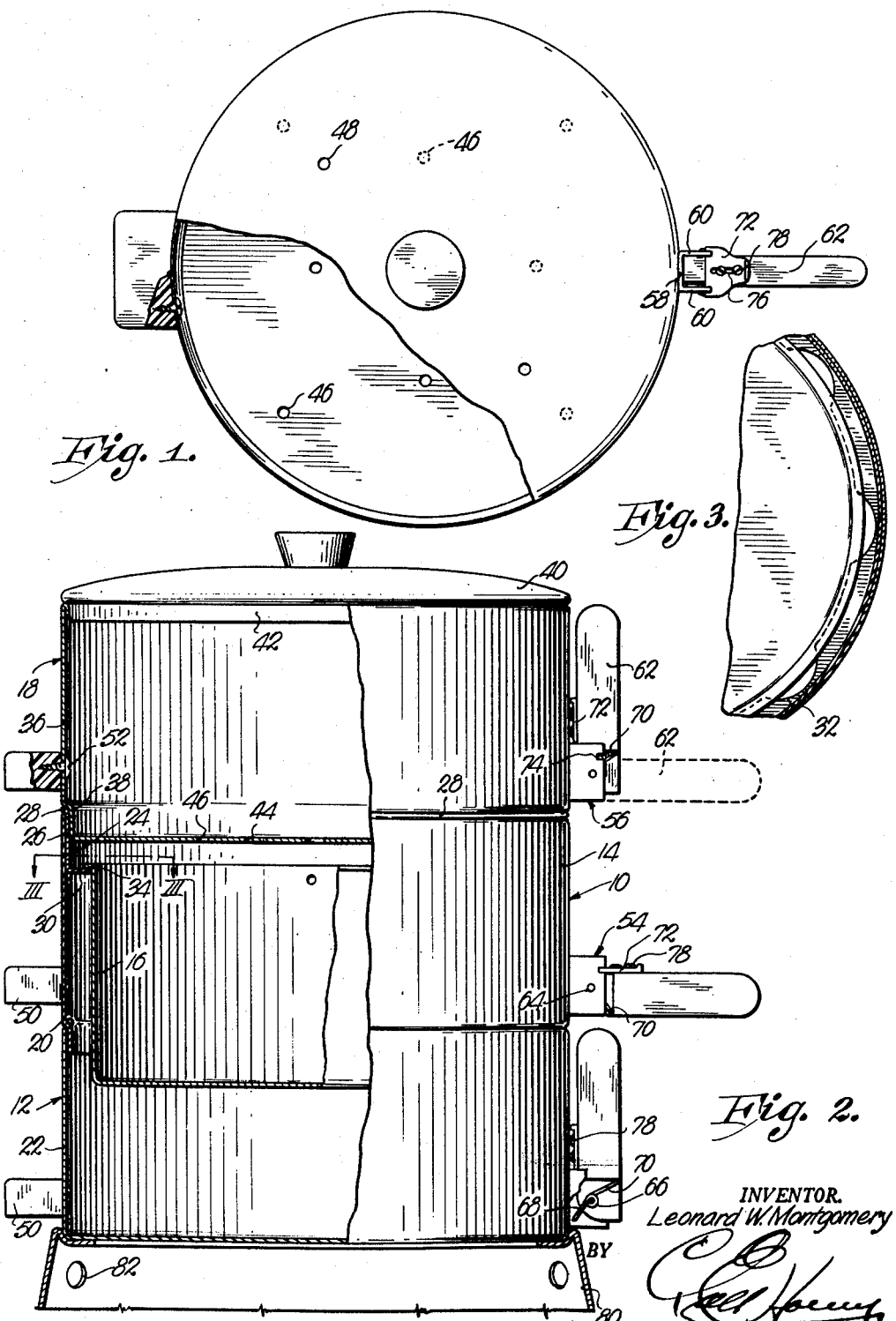
Figure 1 is a plan view of a cooking utensil embodying the concepts of the instant invention, certain parts thereof being broken away and in section to reveal details of construction.
Fig. 2 is a fragmentary, side elevational view of the cooking utensil illustrated in Fig. 1 with certain parts thereof being broken away along vertical planes to reveal the cross-sectional configuration of parts of the utensil.
Fig. 3 is a horizontal, cross-sectional view taken on line III—III of Fig. 2 and looking in the direction of the arrows.

A cooking utensil made in accordance with the present invention is illustrated in the drawing and designated broadly by the numeral 10, utensil 10 including as the major components thereof a lower, hollow, cup-shaped container 12, an intermediate, substantially cylindrical section 14, an inner, hollow, cup-shaped container 16 suspended within intermediate section 14, and an upper, hollow, cup-shaped container 18 disposed in overlying relationship to container 16. As shown in Fig. 2, the lowermost peripheral margin of intermediate section 14 is crimped inwardly to present a circumferentially extending portion 20 of somewhat less diameter than the side wall 22 of container 12. Thus, intermediate section 14 is removably mounted on container 12 in overlying relationship to the same and an annular bracket ring 24 is removably disposed over the upper peripheral edge of intermediate section 14 and is adapted to maintain container 16 in suspension within section 14 and container 12.

Ring 24 includes a substantially vertical, annular segment 26 of somewhat less diameter than intermediate section 14, and segment 26 has an outwardly extending annular bead 28 integral therewith and which is adapted to overlie and engage the uppermost edge of section 14 in a manner to maintain ring 24 suspended within section 14. An annular flange 30 is integral with the lowermost peripheral margin of segment 26 and flange 30 is provided with a series of circumferentially spaced, inwardly facing, arcuate cutouts 32 which extend inwardly in flange 30 to a point adjacent segment 26.

Hollow container 16 is provided with an annular, outwardly extending flange 34 integral with the uppermost edge thereof and which is adapted to overlie and engage flange 30 of ring 24 in a manner to maintain container 16 suspended within section 14 and container 12.

The lowermost part of the side wall 36 of container 18 is also crimped inwardly to present an inwardly pressed, circumferentially extending portion 38, the external diameter of portion 38 being somewhat less than the internal diameter of segment 26 of ring 24 so that container 18 may be positioned in overlying relationship to section 14, with portion 38 disposed within ring 24 and the uppermost end of section 14.

A circular lid 40 having an annular lip 42 adapted to fit within and engage the uppermost end of container 18 is removably disposed over the latter. Bottom 44 of container 18 is provided with a series of spaced perforations 46, and lid 40 also has a plurality of openings 48 in the same.

Each of the containers 12 and 18 and section 14 are provided with a series of handles for facilitating use of the same and include a relatively short block handle 50 secured to the side walls of containers 12 and 18 and section 14 by virtue of suitable screws 52, as well as foldable handles broadly designated by the numeral 54 and which are located in opposed relationship to handles 50. Each of the handles 54 includes a substantially U-shaped bracket 56 having a bight 58 suitably secured to a corresponding side wall of containers 12 and 18 as well as section 14, and a pair of laterally extending, parallel legs 60 adapted to receive one end of elongated handle 62 therebetween. A pin 64 interconnects legs 60 and pivotally receives handle 62 in a manner so that the same may move to and from the positions illustrated in full and dotted lines in Fig. 2. A coil spring 66 is provided around pin 64 and includes a stretch 68 engaging the side wall of one of the containers 12 and 18 or section 14, as well as a stretch 70 which engages a suitable shoulder on handle 62. Spring 66 is disposed on pin 64 in a manner so that stretch 70 normally biases handle 62 into a folded position as illustrated on container 12 in Fig. 2.

Means for maintaining each of the handles 62 in an outwardly extending position includes a plate 72 slidably mounted on the upper face of each of the handles 62 and which is movable into and out of a pair of horizontally aligned slots 74 in legs 60. As illustrated in Fig. 1, each of the plates 72 is provided with an elongated slot 76 extending longitudinally of each of the handles 62 and which receive screws 78 for limiting the extent of sliding movement of plates 72.

If desired, a substantially frusto-conical section 80 may be provided for supporting utensil structure 10 in spaced relationship to the ground or the like, and section 80 is preferably provided with a plurality of openings 82 in the same to permit circulation of air through the interior of section 80.

In operation, section 80 is suitably disposed in surrounding relationship to a source of heat, preferably in the nature of canned heat or the like, whereupon container 12 is positioned over section 80 in direct overlying relationship to the canned heat. Water is then introduced into container 12 to a level somewhat below the contemplated level of the bottom of container 16 and wieners or the like are then placed in the water within container 12. Section 14 is next placed in position over container 12, ring 24 is then mounted on the open, uppermost end of section 14 and finally, container 16 is suspended within section 14 and container 12 on flange 30 of ring 24. Chili or the like is placed within container 16 and subsequently container 18 is mounted on the uppermost end of section 14 in overlying relationship to container 16. Buns or other suitable bread is placed within container 18 and finally, lid 40 is placed over container 18. It can be appreciated that as the canned heat raises the temperature of the water within container 12, the wieners are heated or cooked and, substantially simultaneously therewith, the water which is vaporized by the canned heat rises around container 16 and cooks or heats the chili disposed therewithin. Also, by virtue of the cutouts 32 in flange 30 of ring 24, the vaporized liquid passes upwardly through flange 30 and into container 18 via perforations 46. This vaporized liquid or steam heats the buns disposed within container 18 and finally passes to the atmosphere through openings 48 which operate to prevent the lid 40 from being blown off utensil 10 during use of the same.

Ordinarily, each of the handles 62 is disposed in its folded or retracted position against respective containers 12 or 18 or section 14, but when it is desired to lift one of the containers or section 14, the respective handles 62 may be swung downwardly whereupon plate 72 is shifted inwardly into slots 74 to maintain the handle in its extended position.

It is apparent that utensil 10 is especially adapted for outdoor use, inasmuch as it is portable and may be quickly broken down into its various components for storage or the like. Furthermore, the utility of the same is readily appreciated when it is recognized that three different types of foods may be cooked or heated substantially simultaneously, thereby saving money, time and labor, and furthermore, the food may be cooked or heated while the camper is hunting, fishing or carrying out other activities.

Although the preferred form of the invention has been illustrated in the drawing, it is obvious that various other modifications and changes may be made in the structure without departing from the spirit of the invention and therefore, it is intended to be limited only by the scope of the appended claims.

Having thus described the invention what is claimed as new and desired to be secured by Letters Patent is:

1. In a cooking utensil, a lower, open-top container adapted to receive a liquid and to be disposed over a source of heat for vaporizing the liquid; an intermediate tubular section disposed on and overlying said lower container; an inner, open-top container disposed within said lower container and the section and provided with an outwardly extending annular flange thereon; an annular bracket removably carried by the section and including annularly disposed, inwardly extending, spaced segments adapted to engage said flange for maintaining the inner container in spaced relationship to the inner surfaces of the lower container and the member, the outer peripheral edge of said flange being in sufficiently spaced relationship from said annular bracket to permit vapor to pass through the spaces between said segments; and an upper, open-top container mounted on said section in overlying relationship to the latter, the lowermost portion of said upper container being perforated to permit the vaporized liquid to pass into the same.

2. A cooking utensil as set forth in claim 1 wherein said bracket is removably carried by the section between the latter and said upper container and including an annular, depending skirt portion, said segments being integral with said skirt portion and disposed in horizontally spaced relationship around the lowermost peripheral edge of the latter.

3. In a cooking utensil, a lower, open-top container adapted to receive a liquid and to be disposed over a source of heat for vaporizing the liquid; an intermediate tubular section disposed on and overlying said lower container; an inner, open-top container mounted within said lower container and the section and spaced from the inner surfaces of the same; an upper, open-top container mounted on said section in overlying relationship to the latter, the lowermost portion of said upper container being perforated to permit the vaporized liquid to pass into the same; an elongated handle swingably attached to the outer surfaces of said upper and lower containers and the section adjacent the lower portions of the same; and means on each of the handles and engageable with structure on corresponding containers and the section for releasably maintaining each of the handles in an extended position, said means including a U-shaped assembly having a pair of upright, horizontally spaced legs provided with inwardly extending, horizontally aligned slots and wherein a plate is slidably mounted on one longitudinal face of a corresponding handle in a position to be movable into said slots for maintaining the handle in said extended position.

References Cited in the file of this patent

UNITED STATES PATENTS

| 76,310 | Duncklee | Apr. 7, 1868 |
| 466,137 | Hobson | Dec. 29, 1891 |
| 2,723,329 | Baird | Nov. 8, 1955 |

FOREIGN PATENTS

| 11,848 | Great Britain | Sept. 17, 1886 |
| 19,849 | Great Britain | Nov. 5, 1900 |
| 26,270 | Great Britain | Nov. 20, 1906 |
| 239,864 | Great Britain | Dec. 17, 1925 |
| 670,237 | France | Aug. 17, 1929 |
| 683,228 | Germany | Nov. 1, 1939 |